United States Patent [19]

Axthammer

[11] 4,105,041

[45] Aug. 8, 1978

[54] HYDRAULIC SYSTEM

[75] Inventor: Ludwig Axthammer, Germany

[73] Assignee: Fichtel & Sachs AG, Schweinfurt am Main, Germany

[21] Appl. No.: 711,153

[22] Filed: Aug. 3, 1976

[30] Foreign Application Priority Data

Aug. 7, 1975 [DE] Fed. Rep. of Germany ....... 2535221

[51] Int. Cl.[2] .............................................. F16K 11/10

[52] U.S. Cl. .................................... 137/116; 74/100 P

[58] Field of Search .................. 251/75; 137/116, 115; 74/100 P

[56] References Cited

U.S. PATENT DOCUMENTS

| | | | |
|---|---|---|---|
| 2,652,857 | 9/1953 | Engstrum | 251/75 |
| 2,703,231 | 3/1955 | Ryde | 74/100 P |
| 3,174,500 | 3/1965 | Johnson et al. | 137/115 |
| 3,224,459 | 12/1965 | Lilly | 251/75 |
| 3,270,763 | 9/1966 | Kiefer | 137/116 |
| 3,640,359 | 2/1972 | Clark et al. | 137/115 |

FOREIGN PATENT DOCUMENTS

| | | | |
|---|---|---|---|
| 1,550,120 | 6/1966 | Fed. Rep. of Germany | 137/116 |

*Primary Examiner*—William R. Cline
*Assistant Examiner*—H. Jay Spiegel
*Attorney, Agent, or Firm*—Hans Berman

[57] ABSTRACT

A hydraulic system suitable for supplying fluid under pressure to the brakes and other elements of an automotive vehicle includes a valve casing formed with a first port, normally connected to a pump, a second port normally connected to a fluid storage vessel and the vehicle element to be supplied, and a third port leading to a sump. A valve slide moves in the casing and defines therewith a conduit. The conduit connects the first and third ports in a first slide position and is closed in a second slide position. A spring-loaded check valve connects the first and second ports only when the fluid pressure in the first port is higher than in the second port. A spring permanently biases the valve slide toward the second position while the fluid pressure in the second port tends to move the slide toward the first position. The biasing force of the spring decreases during movement of the valve slide from the second toward the first position.

11 Claims, 6 Drawing Figures

HYDRAULIC SYSTEM

This invention relates to hydraulic systems, and particularly to a hydraulic system in which a multi-way valve controls distribution of a hydraulic fluid under pressure.

The invention will be described hereinbelow in its application to hydraulically operated elements of an automotive verhicle, but is capable of other uses presenting analogous problems. The pump which supplies hydraulic fluid for operating brakes, suspension elements, and other devices on a vehicle is often driven directly by the engine of the vehicle and is inoperative when the engine stands still. Yet, hydraulically operated devices on the vehicle may be needed while the engine is shut off. It is known to supply the vehicle with a storage vessel which holds an adequate reserve of pressure fluid, and which is charged while the engine is running. It is necessary automatically to connect and disconnect the storage vessel from the operating engine to maintain the fluid pressure in the vessel between suitable limits, and the known hydraulic systems employ multiple valves for this purpose.

The primary object of this invention is the provision of a hydraulic system suitable for the purpose outlined above which avoids shortcomings found in the known systems.

When the pump is driven while the storage vessel is already charged to its desired maximum pressure, a valve in the system may switch the fluid stream coming from the pump directly to the pump. It is a shortcoming of many known systems that they rely on throttles in the fluid circuit for establishing pressure drops, and that such throttles are still being passed by the fluid returned directly from the pump to its sump. The fluid is heated unnecessarily, and the undesirable thermal energy is derived from mechanical energy supplied by the driving engine.

Most known hydraulic systems of the type described are quite complex and require a precision fit of moving components to ensure tight seals. In many such systems, several storage vessels operated at different pressures and the associated switching valves cannot be operated in series.

The system of the invention avoids the enumerated undesirable features by including a switching valve whose casing is formed with first, second, and third ports, and a valve member movable in the casing between first and second positions. The valve member and the casing define a conduit connecting the first and third ports in the first position of the valve member and close the conduit in the second position. A check valve connects the first and second ports in response to higher fluid pressure in the first port than in the second port while disconnecting the first and second ports when the fluid pressure in the second port is higher. Yieldably resilient means permanently bias the valve member to move from the second position toward the first position against the biasing force of the yieldably resilient means which decreases during movement of the valve member from the second toward the first position.

Other features, additional objects, and many of the attendant advantages of this invention will readily be appreciated as the same becomes better understood by reference to the following detailed description of preferred embodiments when considered in connection with the appended drawing in which.

Figure 1:
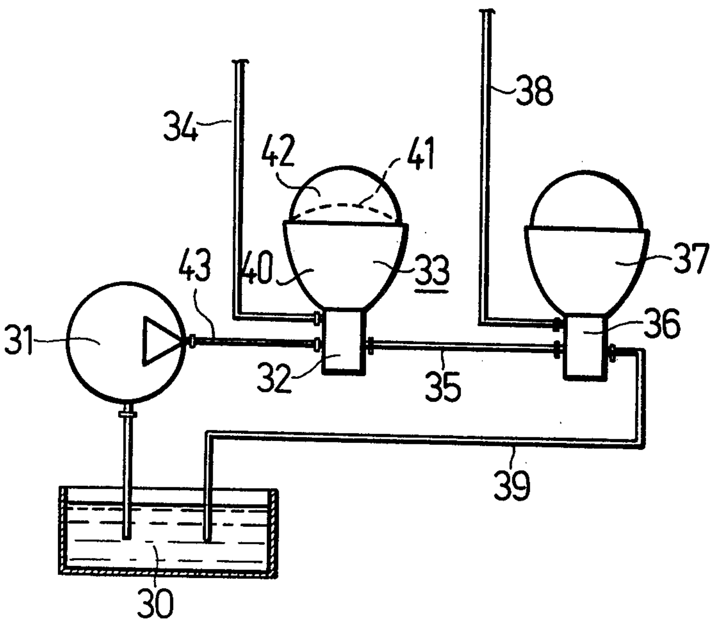
FIG. 1 illustrates hydropneumatic system according to the invention by conventional symbols.

Referring now to the drawing in detail, and initially to FIG. 1, there is seen a high-pressure, positive-displacement pump 31 whose intake pipe dips into a sump 30 for hydraulic fluid. The discharge pipe 43 of the pump 31 is connected as a supply pipe to a first switching valve 32 which controls the charging of a storage vessel 33 to a predetermined maximum pressure. The cavity of the vessel 33 is divided by a resilient diaphragm 41 into a liquid storage compartment 40 and a sealed gas compartment 42. When the pressure in the vessel 33 reaches the set maximum pressure, the switching valve 32 connects the discharge pipe 43 to another switching valve 36 through a line 35 for charging a second storage vessel 37 until a set pressure is reached therein. Thereafter, a return line 39 permits hydraulic fluid to flow from the switching valve 36 to the sump 30.

If the illustrated hydraulic system is installed in an automotive vehicle, the power-assisted brakes of the vehicle may be connected to the storage vessel 33 by a line 34, and the vessel 37 may supply hydraulic fluid under pressure through a line 38 to pneumatic suspension elements for varying their effective length in a manner known in itself and not specifically illustrated. It is preferred to connect the first-charged vessel 33 with the brake system for greater safety. If no second fluid-operated apparatus needs to be supplied, the line 35 may lead directly into the sump 30. When the pressure in the vessel 33 drops below a predetermined minimum value, the line 35 is disconnected from the pump 31 by the switching valve 32 until the vessel 33 is again charged to maximum pressure. Except for different switching pressures, the valves 32 and 36 may be identical.

Figure 2:
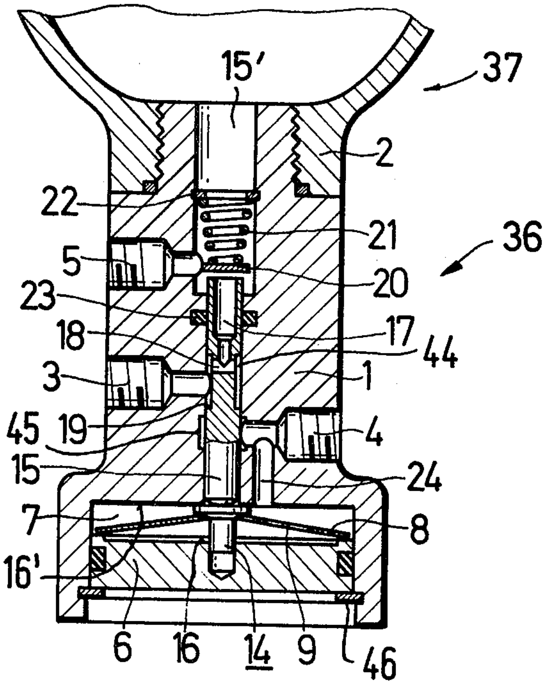
FIG. 2 shows a switching valve for the system illustrated in FIG. 1 in sectional elevation.
Figure 3:
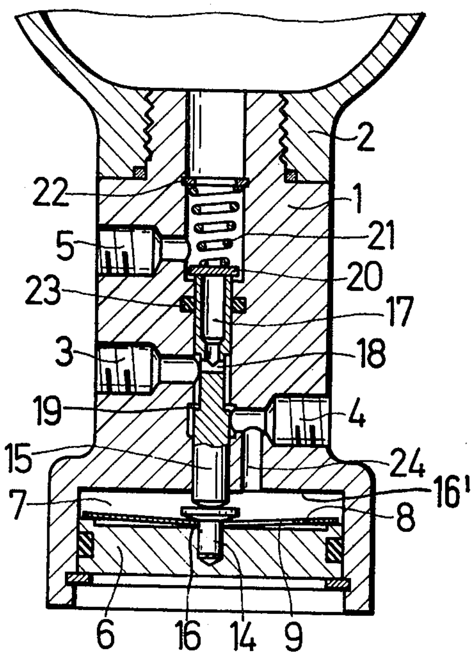
FIG. 3 shows the valve of FIG. 2 in a different operating condition.

FIGS. 2 and 3 show the switching valve 36 in greater detail, but the same valve may be employed with minimal changes for controlling pressure in the vessel 33, as will presently become apparent.

The switching valve 36 is a multi-way valve whose generally cylindrical casing 1 is fixedly mounted on the shell 2 of the associated storage vessel 37. An inlet port 3 in the cylindrical outer wall of the casing 1 is normally sealed to the line 35, a return port 4 to the sump 30 through line 39, and a discharge port 5 to the line 38. An enlarged axial end of the casing 1 encloses a chamber 7 axially sealed by a circular cover 6 carrying a circumferential sealing ring and held in position by a spring clip 46 partly recessed in a cylindrical inner wall of the casing 1.

A normally conical, centrally apertured plate spring 8 is retained in the chamber 7. Radial slots extending outward from the central aperture of the spring separate finger portions 9 of the spring 8. The imperforate outer circumference of the spring rests on the cover 6 in all operative conditions of the spring 8.

A flanged, motion-transmitting pin 14 guided in a central, axial, blind bore of the cover 6 passes through the aperture of the spring 8, and its flange engages the radially inner ends of the finger portions 9 in all positions of the pin 14 and the spring 8. The pin 14 abuts against one axial end of a valve slide 15 axially guided in a central bore 15' of the housing 1. Movement of the pin 14 in the chamber 7 is limited by abutting engagement of its flange with the radial end wall 16' of the casing 1 in the chamber 7, as is shown in FIG. 2, and by abutting engagement of the finger portions 9 with the cover 6 in a shallow circular recess 16 of the latter, as is illustrated in FIG. 3.

The valve slide 15 has a central axial bore 17 having an orifice directed axially toward the vessel 37, and a radial bore 18 connecting the bore 17 with an annular, circumferential groove 44 in the otherwise smoothly cylindrical, outer, axial surface of the slide 15. A shoulder 19 axially bounds the recess 44 toward the pin 14. The slide 15 has an annular valve seat about the orifice of the bore 17 which may be closed by a valve plate 20 suspended from a conically helical compression spring 21 secured in the bore 15' between the valve slide 15 and the cavity of the vessel 37 by a spring clip 22.

In the condition of the switching device shown in FIG. 2 in which the stress in the plate spring 8 is at its lowest value, the port 3 communicates with the recess 44 and the bores 17, 18. The port 4 permanently communicates with an annular recess 45 in the casing 1 which is open toward the bore 15'. The recess 45 is sealed radially and axially by the valve slide 15, but the port 4 communicates with the chamber 7 through a duct 24 in the casing 1. The port 5 permanently communicates with the vessel 37 through the bore 15' of the casing 1. The valve plate 20 is lifted from the orifice of the bore 17 by the pressure of hydraulic fluid entering the bore 17 from the pump 31 through the port 3. A resilient sealing ring 23 recessed in the casing 1 engages the outer axial face of the slide 15 and prevents hydraulic fluid under pressure from by-passing the bores 17, 18.

Figure 4:
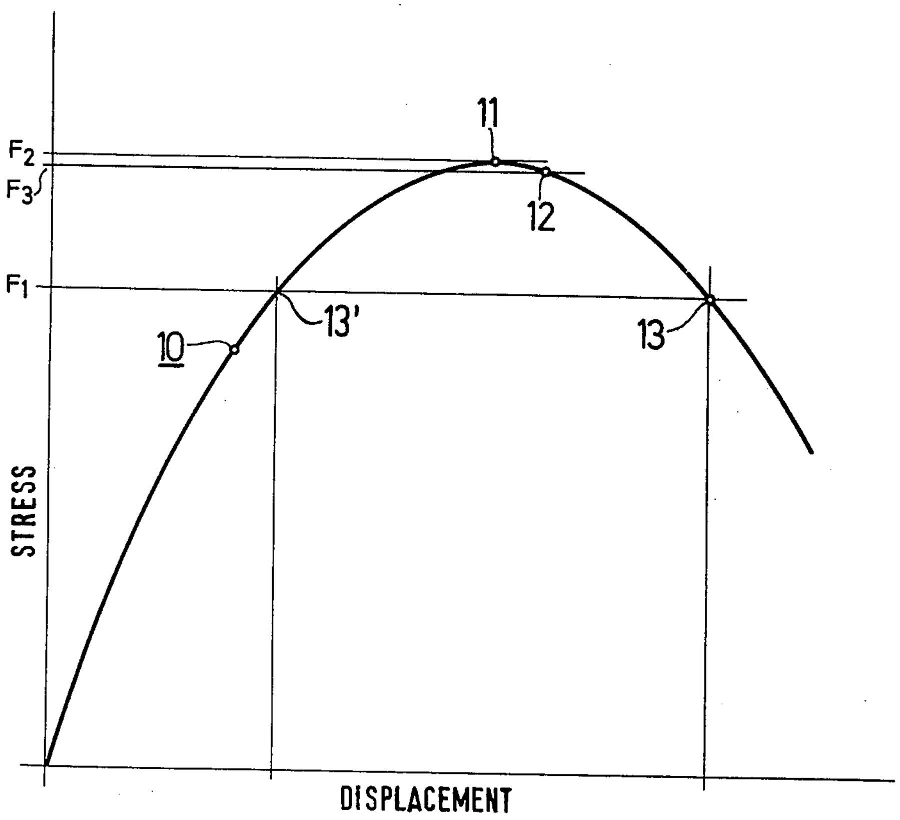
FIG. 4 is a diagram of the characteristics of a spring in the valve of FIGS. 2 and 3.

The characteristic stress-displacement curve of the plate spring 8 is shown in FIG. 4 in arbitrary linear units. Under no operating conditions of the switching valve 36 is the spring 8 fully relaxed, and its apex angle in the relaxed condition would be smaller than is shown in FIG. 2. The condition of the spring illustrated in FIG. 2 corresponds to point 10 on the curve in which the vessel 37 is empty of hydraulic fluid, and the spring stress is sufficient to hold the flange of the pin 14 against the radial wall 16' of the casing 1 in the chamber 7. As the pump 31 begins supplying hydraulic fluid, pressure is being built up in the storage vessel 37 and stored in the gas cushion confined between the shell 2 and the diaphragm 41.

When the fluid pressure acting on radial faces of the slide 15 becomes sufficient to overcome the initial prestress of the spring 8, the spring is deformed along the curve of FIG. 4 while its resistance to further deformation increases until point 11 on the curve is reached when the spring 8 is approximately flat and exerts its maximum force $F_2$ on the valve slide 15 whose position at this stage is approaching that illustrated in FIG. 3, but the shoulder 19 on the valve slide 15 is not yet radially aligned with the recess 45. Thereafter, the spring 8 resists further travel of the slide 15 with decreasing force until the force of the hydraulic fluid acting on the valve slide 15 is no longer balanced by the force of the spring 8 and frictional forces in the system and causes almost instantaneous collapse of the spring 8 into the position illustrated in FIG. 3 at which the stress $F_1$ in the spring 8 decreases to a value 13, higher than the initial value 10 because of the unsymmetrical deflection of the spring 8 in its two terminal positions.

The shoulder 19, now in radial alignment with the groove 45 in the casing 1, permits fluid flow from the inlet port 3 to the return port 4, and the sudden opening of this flow path causes a drop of the pressure in the bore 17 to a value no longer capable of holding the valve 20 away from the orifice of the bore 17 against the spring 21 and the higher fluid pressure in the port 5 and the vessel 37. The check valve constituted by the plate 20 and the associated spring 21 closes.

When hydraulic fluid in the vessel 37 is consumed, the gas cushion sealed in the compartment 42 expands until the pressure in the vessel decreases to a value which permits the force $F_1$ of the spring 8 to overcome the combined resistance of the spring 21, of the hydraulic pressure in the vessel 37 and of friction. The spring 8 reverts with increasing speed to the flat shape characterized by point 11 on the curve of FIG. 4, and thereafter partially relaxes toward the conical shape shown in FIG. 2 while the hydraulic pressure quickly building up in the bore 17 after sealing of the port 4 by the shoulder 19 opens the check valve 20, 21. The minimum, normal operating stress of the spring 8 is reached at point 13' at a value $F_1$ approximately equal to the force exerted by the spring in the position of FIG. 3.

The valve shown in FIGS. 2 and 3 is readily modified for a plate valve 8 which does not pass through a condition of maximum stress during each switching operation. As not explicitly illustrated, a spacer ring may be placed between the periphery of the spring 8 and the cover 6 in such a manner that the spring 8 is in the condition represented in FIG. 4 by point 12 on the characteristic curve while the flange of the pin 14 abuts against the radial wall 16' of the casing. The resulting prestress in the spring causes the valve slide 15 to be pressed outward of the chamber 7 with a force $F_3$. The slide remains in the position illustrated in FIG. 2, until the pump 31 charges the vessel 37 to a pressure exceeding the combined effects of the force $F_3$ and of friction in the system. Upon a further increase in hydraulic pressure on the slide 15, the spring 8 offers decreasing resistance so that the spring is deformed almost instantaneously into a conical shape which is the approximate mirror image of that shown in FIG. 2. The pressure drop in the flow path between the now connected ports 3, 4 and bores 17, 18 causes closing of the check valve 20, 21, and a condition analogous to that of FIG. 3 is maintained until the pressure in the shell 2 is reduced by withdrawal of hydraulic fluid to an extent permitting the spring 8 to return upward to the point 12 along the curve of FIG. 4.

The duct 24 connecting the chamber 7 to the port 4 permits the discharge of any fluid leaking into the chamber along the slide 15 in the bore 15'. The switching valve shown in FIGS. 2 and 3, however, is not preferred for operation under conditions in which substantial hydraulic pressure is maintained in the port 4 as by another switching valve connected to the port in the manner shown in FIG. 1. A modified switching valve 32 more suitable for this purpose is shown in FIG. 5.

Figure 5:
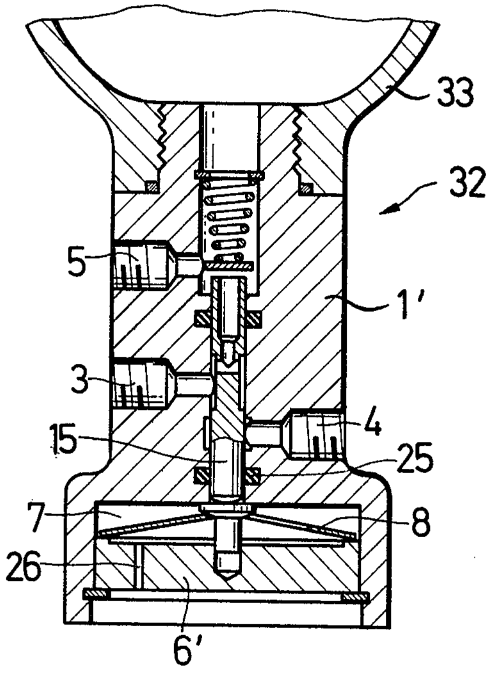
FIGS. 5 and 6 illustrate two modifications of the valve of FIG. 2 in corresponding views.

The switching valve 32 illustrated in FIG. 5 differs from the afore-described valve 32 mainly by a casing 1' which lacks the duct 24 and has an axial bore 26 in a modified cover 6' which connects the chamber 7 to the atmosphere for release of leaked hydraulic fluid, the leakage being held to a minimum by an additional sealing ring 25 in the central bore of the casing 1' between the port 4 and chamber 7. In the valve position shown in FIG. 5, fluid under pressure in the port 4 cannot exert an axial force on the slide 15. The sealing ring 25 may be dispensed with if loss of hydraulic fluid from the chamber 7 is not objectionable, or if the bore 26 is connected to the sump 30 by a hose. The elements common to the valves of FIGS. 5 and 2 have been identified by the same reference numerals and do not require repeated description.

As is evident from FIG. 1, the ports 3, 4, 5, of the valve 32 are connected to the lines 43, 35, 34 respectively, and the valve directs the output of the pump 31 to the associated vessel 33 until the pressure in the vessel can flip the spring 8 from the position shown in FIG. 5 so that additional pumped liquid reaches the valve 36. The valve shown in FIG. 5 may replace the valve 36 in the hydraulic system of FIG. 1 if equipped with a spring 8 slightly less rigid than the spring in the otherwise identical valve associated with the first storage vessel 33.

Figure 6:
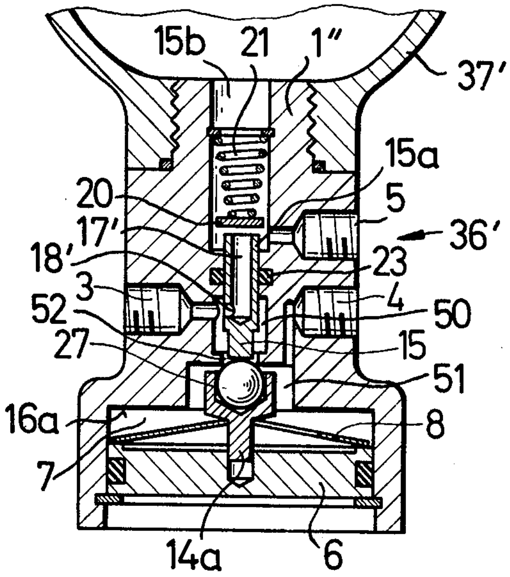

Another modified switching valve 36′ suitable for controlling either storage vessel in the hydraulic system of FIG. 1 is shown in FIG. 6. Its casing 1″ has an axial throughbore 15*b*. A check valve 20, 21 is arranged in one end of the bore, and a valve slide 15*a* having communicating axial and radial bores 17′, 18′ extends over the remaining axial length of the bore 15*b*. The orifice of the bore 17′ is controlled by the check valve 20, 21 as described with reference to FIG. 2. A radially enlarged portion 50 of the casing bore 15*b* communicates permanently with the inlet port 3 of the casing 1″ and the bore 18′ and is sealed toward the spring 21 by a sealing ring 23. A reduced end portion of the valve slide 15 bounds an annular channel 52 in the bore 15*b* capable of connecting the bore portion 50 with a recess 51 in the radial casing wall 16*a* which bounds a chamber 7 in the casing 1″.

A blind bore in the cover 6 which seals the chamber 7 in an axially outward direction guides the stem of a pin 14*a* passing through a central aperture of a plate spring 8 practically identical with the corresponding element described with reference to FIG. 2. The enlarged head of the pin 14*a* is formed with a receptacle for a steel ball 27 abuttingly engaging the reduced end portion of the valve slide 15*a* and sealing the channel 52 in the illustrated position under the pressure of the spring 8. The return port 4 permanently communicates with the chamber 7 through the recess 50. The discharge port 5 permanently communicates with the storage vessel 37 through the bore 15*b*. The spring 8 is confined between the head of the pin 14*a* and the raised, outer rim of the cover 6 as described in more detail with reference to FIG. 2.

The switching valve illustrated in FIG. 6 operates in the same manner as described above with reference to FIGS. 2 to 5. Hydraulic fluid is driven by the pump into the associated storage vessel 37′ through the port 3, the bores 18′, 17′, 15*b* and keeps the valve plate 20 off the orifice of the bore 17′. When the pressure in the vessel 37′ reaches a value sufficient to depress the valve slide 15*a* and the ball 27 against the restraint of the spring 8, fluid escapes from the port 3 toward the sump 30 through the bore portion 50, the channel 52, the recess 51, and the port 4, and the greater fluid pressure in the vessel 37′ closes the check valve 20, 21. The spring 8 remains in a position analogous to that shown in FIG. 3 until withdrawal of hydraulic fluid from the vessel 37′ permits the spring to raise the ball 27 into sealing engagement with the casing wall 16*a*.

While it is advantageous to attach the valve casing to the shell of the associated storage vessel, as is shown in FIGS. 2, 3, 5, and 6, and to connect the discharge port 5 on the casing with a device that draws hydraulic fluid from the storage vessel, this arrangement is not mandatory. The lines 34, 38 may be connected to the vessels 33, 37 remote from the valves 32, 36 without affecting the mode of operation, and conversely, the storage vessel may be connected directly to a portion of the associated line 34, 38 spaced from the port 5. The axially open end of the central bore in the valve casing may thus itself constitute the discharge port.

Similarly, the check valve 20, 21 which communicates with the first or inlet port 3 and the second or discharge port 5 may be arranged outside the valve casing without loss of function as long as it connects the ports in response to fluid pressure in the first or inlet port 3 higher than in the discharge port, and disconnects the first and second ports when the fluid pressure in the second or discharge port is higher than in the first or inlet port.

The movement of the valve slide against the biasing force of the associated spring 8 in response to fluid pressure in the discharge port 5 or any space communicating therewith is brought about by the valve seat and other radial faces of the slide itself being exposed to the pressure fluid or by the valve plate 20 when the check valve 20, 21 is closed. However, hydraulically operated pistons are commonly linked to slide valves for moving the latter and may be resorted to in the switching valves of the invention in an obvious manner.

The advantages of combining several functions in the same structural element are evident, and the illustrated examples of the switching valves of the invention are preferred for this reason.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. A hydraulic system comprising:

(a) a valve casing formed with first, second, and third ports;

(b) a valve member movable in said casing between a first position and a second position, (1) said valve member and said casing defining a conduit connecting said first and third ports in said first position of said valve member, said valve member closing said conduit in said second position of said valve member;

(c) check valve means connecting said first and second ports in response to fluid pressure in said first port higher than the fluid pressure in said second port while disconnecting said first and second ports when the fluid pressure in said second port is higher than in said first port;

(d) yieldably resilient means permanently biasing said valve member to move from said first to said second position thereof; and (e) means on said valve member responsive to pressure of fluid in said second port for moving said valve member from said second position toward the first position thereof against the biasing force of said yieldably resilient means, (1) said force decreasing during a portion of said movement of the valve member from said second position toward said first position.

2. A system as set forth in claim 1, wherein said casing bounds a chamber, said yieldably resilient means include a plate spring received in said chamber and having a portion secured to said casing against relative movement and another portion operatively connected to said valve member for movement therewith, said system further comprising abutment means on said casing preventing said other portion from moving beyond two terminal positions, said force decreasing while said other portion approaches one of said terminal positions during said movement of the valve member toward said first position thereof.

3. A system as set forth in claim 2, wherein said force increases during movement of said other portion away from the other terminal position and prior to said decreasing during said movement of the valve member toward said first position thereof.

4. A system as set forth in claim 2, wherein said plate spring is formed with an aperture therethrough and with slots radiating from said aperture toward the circumference of said plate spring.

5. A system as set forth in claim 4, wherein said slots define therebetween finger portions of said plate spring having free ends adjacent said aperture of said plate spring, said yieldably resilient means further including a motion-transmitting member guided in said casing in the direction of movement of said valve member, said motion-transmitting member engaging said finger portions and said valve member for transmitting motion therebetween.

6. A system as set forth in claim 5, wherein said motion-transmitting member is received in said aperture of said plate spring.

7. A system as set forth in claim 4, wherein said casing is formed with a bore, said valve member being movably received in said bore, respective portions of said bore communicating with said ports.

8. A system as set forth in claim 7, wherein a part of said valve member constitutes a valve seat, and said check valve means includes a valve element and a spring biasing said valve element toward engagement with said valve seat, said valve seat bounding an orifice of a passage in said valve member communicating with said first port.

9. A system as set forth in claim 2, wherein respective faces of said casing in said chamber constitute said abutment means.

10. A system as set forth in claim 1, further comprising a source of hydraulic fluid under pressure connected to said first port, a storage vessel for said fluid connected to said second port, and a return line connected to said third port.

11. A system as set forth in claim 1, further comprising means for preventing fluid under pressure in said third port from exerting a force on said valve member in a direction from one of said first and second positions to the other position when said valve member is in said second position thereof.

* * * * *